Figure 2B:
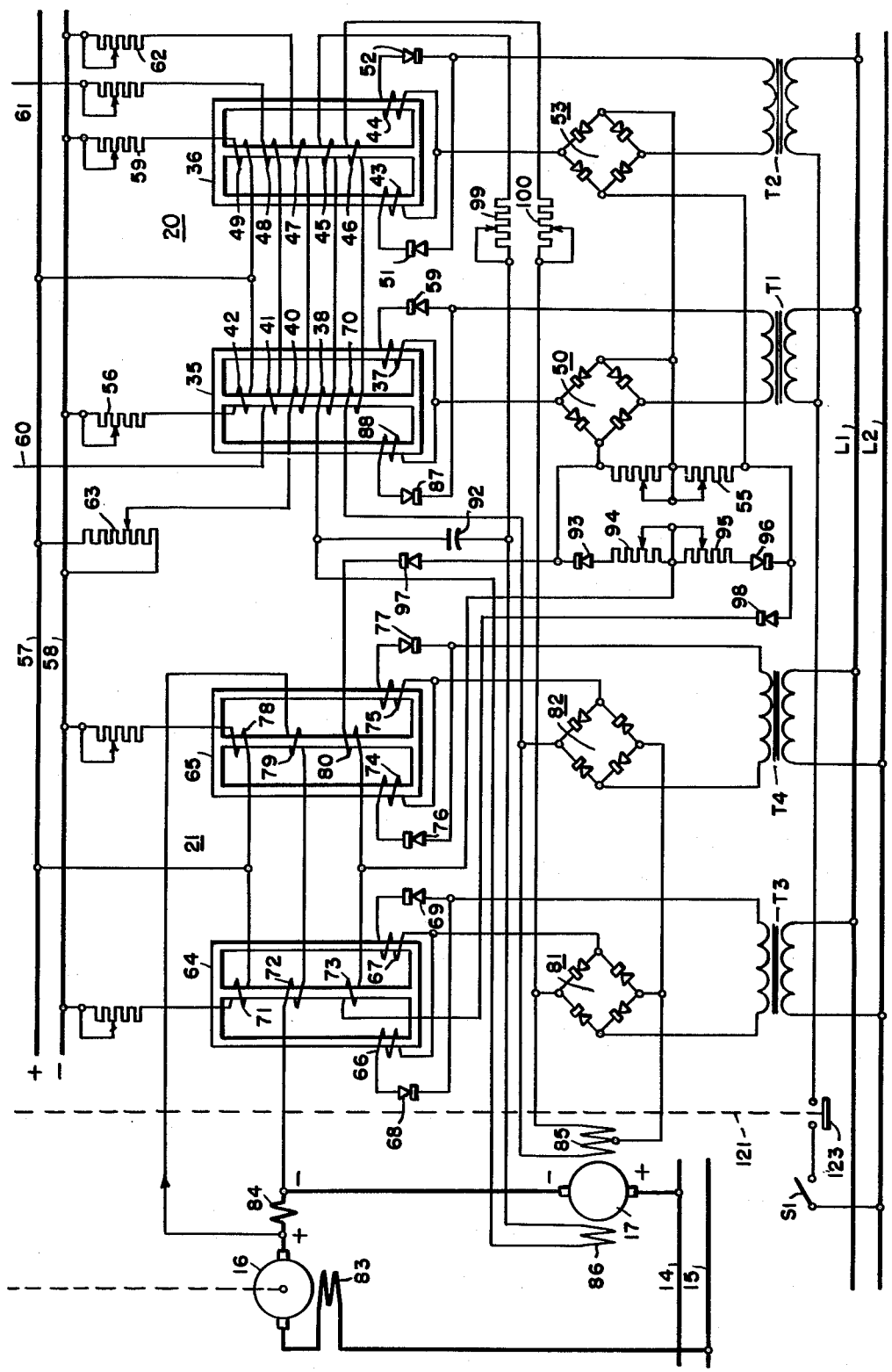

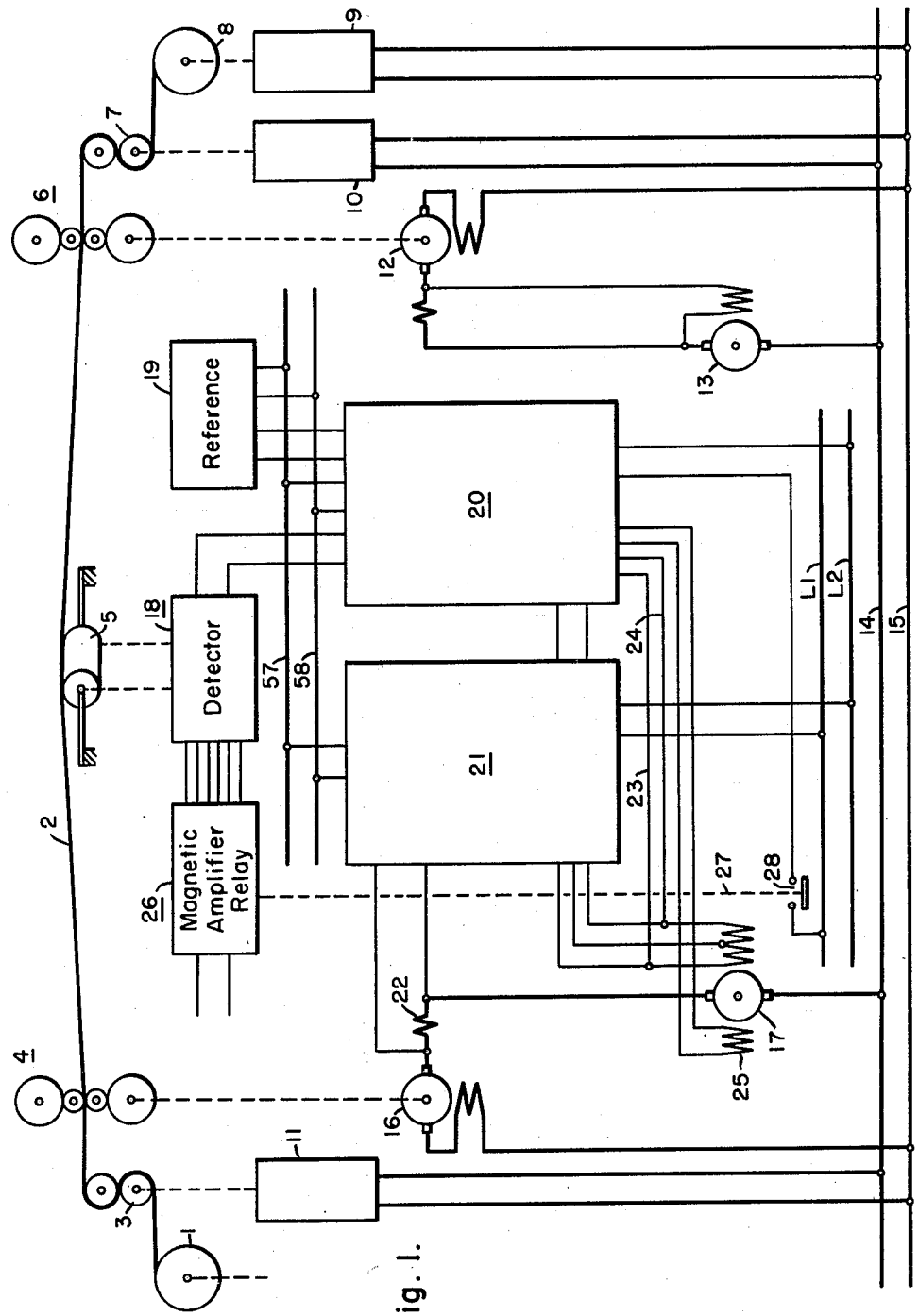
Fig. I.
INVENTORS
Raymond W. Moore &
Arthur O. Fitzner.

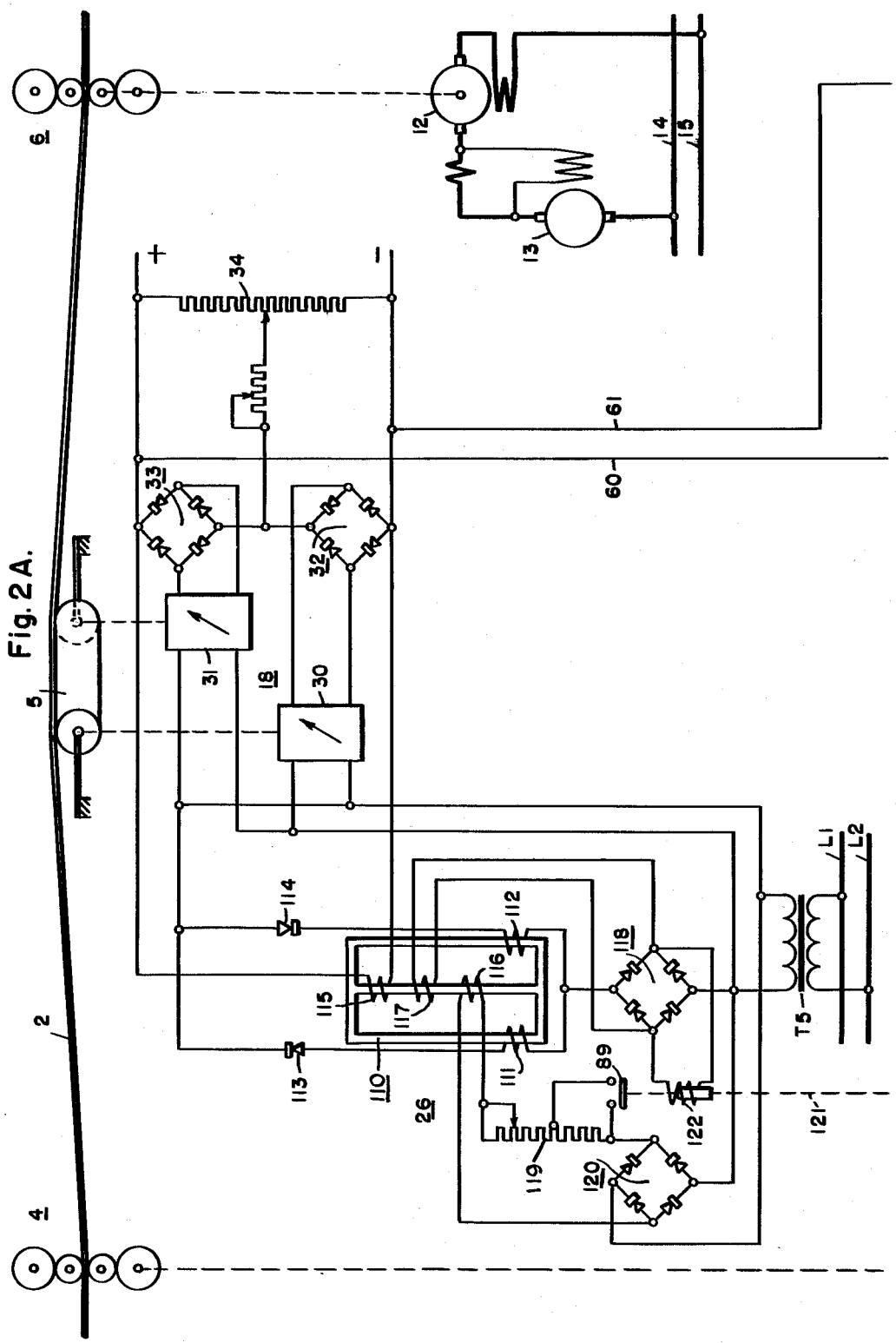

United States Patent Office 2,715,701
Patented Aug. 16, 1955

2,715,701

MOTOR REGULATION FOR STRIP TENSION CONTROL

Raymond W. Moore, Snyder, and Arthur O. Fitzner, Eggertsville, N. Y., assignors to Westinghouse Electric Corporation, East Pittsburgh, Pa., a corporation of Pennsylvania Application September 30, 1953, Serial No. 383,208

16 Claims. (Cl. 318—6)

This invention relates generally to tension control systems, and it has reference in particular to a tension control system such as may be used to control the tension of a strip of material in a strip mill or the like.

The system illustrated was designed specifically for use in a two stand temper pass mill although it will be appreciated that it will be useful in any system where precise control and regulation of the tension of a strip of material is mandatory such as in the processing of steel, paper, or textiles. In a system of the type shown, the tension of the material being processed between the mill stands is of particular importance. The second stand is the master stand and determines the rolling speed. The tension regulating devices for systems of the character contemplated herein such as delivery tension devices and winding reels can have the strip tension regulated between them by current regulators for regulating the current in their armature circuits. The remaining and major regulating problem is the control of strip tension between the first two stands. A current regulator cannot be used on the first stand to regulate the tension between the first and second stands since the armature current of the drive motor for the first stand is not a correct indication of strip tension. The motor armature current must supply the friction and rolling losses as well as the tension load. A regulator which permits fast and accurate control of the torque of the driving motor for the first stand to regulate the tension of the strip between the first and second stand is required. Another requisite of the type control system referred to is that the tension regulation be eliminated for threading the mill or at any time that the strip of material is not operatively passing between the stands, such as when a break occurs.

Accordingly, it is an object of this invention to provide a control system for strip material in a mill which will regulate the tension of the strip.

A more specific object of this invention is to provide a control system for strip material in a mill which is responsive to a strip tension signal to regulate the tension of the strip.

Another specific object of this invention is to provide a control system for strip material in a mill which is responsive to a strip tension signal only when the strip is operatively passing through the mill.

A still more specific object of this invention is to provide a control system of the character referred to which provides IR compensation for the armature circuit of the drive motor of the first stand of the mill under normal operating conditions and an increased speed of response of the IR compensation for threading operation.

The objects stated are merely illustrative. These and other objects will become more apparent from a study of the following specification and accompanying drawings in which:

Figure 1 shows the system contemplated in block form, and

Figs. 2A and 2B combined show diagrammatically the circuit.

The two stand temper pass mill as shown in Fig. 1 comprises a payoff reel 1, from which the strip of material 2, which is to be processed, is unwound, an entry tension device 3, the first mill stand 4, a tension detecting device 5 which is designed to respond to tension of the strip of material 2, the second mill stand 6, a delivery tension device 7, and a windup reel or roll 8. The windup reel or roll 8 is driven by the winder drive 9 and the strip of material 2 passes from the payoff reel 1 between the rolls of the entry tension device 3, between the rolls of the first mill stand 4, over the tension measuring device 5, between the rolls of the second mill stand 6 and the rolls of the delivery tension device 7, onto the windup reel 8.

The delivery tension device drive 10 and the entry tension device drive 11 are current regulated to obtain the desired tension between the entry and delivery tension devices and their respective mill stands. These drives are not illustrated in detail since per se they do not form part of the present invention. Information relating to one type of drive suitable for application to tensioning rolls 3 and 7 may be had by reference to a copending application of A. J. Winchester, Jr., filed August 19, 1950, Serial No. 180,405, entitled Tension Control System and assigned to the assignee of this invention. The drive for the second mill stand 6 consists of a drive motor 12 and a booster generator 13 connected in series with each other and across the main buses 14 and 15. The second stand is the master stand, and the speed of the drive of the second stand determines the rolling speed.

The drive for the first mill stand 4 consists of a motor 16 connected in series with a booster generator 17 across the main buses 14 and 15. Since the motor current of the drive motor 16 for the first mill stand must supply friction and rolling losses as well as the tension correcting torque, the armature current of the drive motor is not a true indication of the strip tension, and, therefore, current regulation cannot be used to regulate the tension between the first and the second mill stands. In order to regulate the tension of the strip of material 2 between the first and the second mill stands, the tension detecting device 5 is used. The tension detecting device or tensiometer is preferably of the double cantilever beam supported type. This detecting device has small mass and fast response and can, therefore, follow changes in strip tension accurately. In this device, strip tension causes an output voltage to be produced in a detector 18. The voltage is produced by two moving-armature electromagnetic devices.

A reference voltage and the voltage from the tension detector 18 are matched by applying each to a separate control winding of the first magnetic amplifier stage 20. Thus, the output of the first magnetic amplifier stage 20 is determined by the difference between the voltage from the reference source 19 and the voltage from the tension detector 18. Actually it is the magnetomotive forces caused by the reference voltage source 19 and the tension detector voltage source 18 that are matched rather than the voltages themselves and thus the tension and reference signals are electrically isolated.

The second magnetic amplifier stage 21 has its output controlled in accordance with the output of the first magnetic amplifier stage 20 and the current flowing through the impedance 22 which is in series with the armature of the drive motor 16 for the first mill stand 4. The output of the second magnetic amplifier stage 21 supplies the field excitation for the booster generator 17 to thus control armature current of the drive motor 16 for the first mill stand, and, consequently, regulate the tension of the strip of material 2 between the first mill stand 4 and the second mill stand 6. A signal is fed back to the first magnetic amplifier stage 20 from the output of the second magnetic amplifier stage 21 by the leads 23 and 24 to prevent hunting. An anti-hunt damping signal is fed back to the first magnetic amplifier stage 20 from an auxiliary field 25 on the booster generator 17. The signal which is fed back from the auxiliary field 25 is approximately proportional to the rate of change of the output of the booster generator 17 and is utilized for damping purposes.

The tension detector 18 also supplies a signal to a magnetic amplifier relay circuit 26. The magnetic amplifier relay circuit 26 is provided for the purpose of insuring that the system does not try to regulate for tension when the strip of material 2 is not operatively passing between the first and second mill stands 4 and 6; that is, the system does not regulate for tension when the strip of material is being threaded in the mill, or when the strip of material is broken. It may be seen that if the system were regulated for tension during the treading process, the motor 16 of the mill stand 22 would be slowed down in an attempt to increase the tension between the two mill stands. Since the tension signal is measured by the tension detecting device 5, the first mill stand 4 would continue to slow down within the limits of the regulator because no tension signal would be supplied to the first magnetic amplifier stage 20 and the full unopposed reference signal would determine the output of the booster generator 17. Hence, the magnetic relay 26 is provided. The magnetic amplifier relay 26 picks up the relay 27 when it has an output; that is, when the tension detector 18 supplies a tension signal, and thereby connects the first magnetic amplifier stage 20 to its supply source through the contacts 28. However, if there is no tension signal supplied from the tension detector 18, the magnetic amplifier relay 26 will not have an output, and the contacts 28 of the relay 27 will be open to disconnect the first magnetic amplifier stage 20 from its supply, and therefore, the system will not regulate for tension. Also, the anti-hunt feedback signals from the output of the second magnetic amplifier stage 21 and the special field 25 on the booster generator 17 will be effectively disconnected from the system, since they are fed back to the first magnetic amplifier stage 20. Thus, the output of the second magnetic amplifier stage 21 will cause the drive motor 16 for the first stand 4 to run at a desired speed for threading purposes, and an appreciable amount of IR compensation will be applied to the armature circuit of the motor 16 to prevent stalling. The response of this IR compensation is fast, since the damping feedback signal from the special field winding 25 of the booster generator 17 is ineffective due to the first magnetic amplifier stage 20 being removed from the system.

The main generator which supplies the system is connected to supply the voltage between the main bosses 14 and 15. To jog, either in the forward or reverse directions, a reduced excitation is supplied to the main generator which is of the proper magnitude and sense to cause the mill stand drive motors to rotate in the desired direction and at the desired rate of speed. The main generator and the jogging system are not shown since they are well known in the art and are not considered a part of this invention.

The circuit of Figs. 2A and 2B combined shows the system in more detail. A strip of material 2, the tension measuring device 5, the rolls of the first mill stand 4 and the rolls of the second mill stand 6 are given the same reference characters as were used in Fig. 1. The tensiometer 5 has the two moving armature electromagnetic detector heads 30 and 31 to measure the strip tension of the material 2 at either side. The outputs of the detector heads 30 and 31 are connected across the input terminals of the full wave bridge rectifiers 32 and 33, and their outputs are mixed across the resistor 34.

The first magnetic amplifier stage 20 consists of magnetic amplifiers 35 and 36, each having its circuits connected in a conventional doubler arrangement. The magnetic amplifier 35 has main windings 88 and 37, anti-hunt damping winding 38, anti-hunt degeneration winding 70, reference control winding 40, tension control winding 41 and a biasing winding 42. The magnetic amplifier 36 has main windings 43 and 44, anti-hunt damping winding 45, anti-hunt degeneration winding 46, reference control winding 47, tension control winding 48, and a biasing winding 49. The main windings 88 and 37 of the magnetic amplifier 35 are connected in series with saturating rectifiers 87 and 39 and the series circuits are connected in parallel with each other. The supply for the magnetic amplifier 35 comprises the transformer T1, which has one terminal connected between the saturating rectifiers 87 and 39, and the opposite terminal connected to one input terminal of the full wave bridge rectifier 50. The opposite input terminal of the full wave bridge rectifier 50 is connected at a point between the main windings 88 and 37 of the magnetic amplifier 35. In like manner, the main windings 43 and 44 of the magnetic amplifier 36 are connected in series with saturating rectifiers 51 and 52 and are supplied by transformer T2. One secondary terminal of the transformer T2 is connected at a point between the saturating rectifiers 51 and 52 of the magnetic amplifier and the opposite terminal of the transformer T2 is connected to one input terminal of the full wave bridge rectifier 53. The opposite input terminal of the full wave bridge rectifier 53 is connected at a point between the main windings 43 and 44 of the magnetic amplifier 36.

The output terminals of the full wave bridge rectifier 50 are connected across the mixing resistor 54 and the output terminals of the full wave bridge rectifier 53 are connected across the mixing resistor 55, and thus the resultant of the voltages from the magnetic amplifier 35 and the magnetic amplifier 36 appears across the two mixing resistors 54 and 55. The bias winding 42 of the magnetic amplifier 35 is connected in series with the adjusting potentiometer 56 across the leads 57 and 58 which carry a D.-C. supply voltage. The bias winding 49 of the magnetic amplifier 36 is connected in series with an adjusting potentiometer 59 across the leads 57 and 58. The tension control windings 41 and 48 of the magnetic amplifiers 35 and 36 are connected in series with each other and by the leads 60 and 61 across the resistor 34 and thus receive the voltage generated by the tensiometer 5 which is a measure of the tension in the strip of material 2.

The tension control windings 41 and 48 are wound such that the current that flows through the windings due to the voltage across the mixing potentiometer 34 drives the core of the magnetic amplifier 36 away from saturation or towards cutoff and causes the core of the magnetic amplifier 35 to be saturated. The reference control windings 40 and 47 of the magnetic amplifiers 35 and 36, respectively, are also connected in series with each other and across a reference source through the adjusting potentiometers 62 and 63. The reference control windings 40 and 47 are also wound in opposite senses with respect to their respective cores; that is, the current which flows through the reference control windings due to the voltage across the leads 57 and 58 as adjusted by the adjusting potentiometers 62 and 63 causes the core of the magnetic amplifier 35 to be driven towards cutoff and the core of the magnetic amplifier 36 to be driven towards saturation. Thus, it may be seen that the effect of the tension control winding 41 is in opposition to the effect of the reference control winding 40 on the core of the magnetic amplifier 35 and similarly, the effect of the tension control winding 48 is in opposition to the effect of the reference control winding 47 on the core of the magnetic amplifier 36. The tension and reference signals are matched by matching the effect of their magnetomotive forces on the cores of the magnetic amplifiers 35 and 36 of the first magnetic amplifier stage 20.

The first magnetic amplifier stage then operates as follows: The voltage across the reference windings 40 and 47 is set so that the system will give a desired tension in the strip of material 2. If the strip of material is passing between the first and second mill stands 4 and 6, respectively, at a tension which is less than that selected by the reference voltage, the tensiometer 5 will cause a voltage to appear across the mixing potentiometer 34, and, consequently, a voltage to appear across the tension control windings 41 and 48. The magnetomotive force of the tension control windings 41 and 48 will not be sufficient to match the magnetomotive force of the reference control windings 40 and 47. Therefore, the magnetic amplifier 35 will be driven toward cutoff and the magnetic amplifier 36 will be driven towards saturation. Therefore, the magnetic amplifier 36 will have an increased output which will appear across the mixing resistor 55 with a positive polarity at the lower terminal of the mixing resistor 55. If, on the other hand, the tension in the strip of material 2 should be greater than that tension selected by the reference voltage, the tension control windings would be controlling and the magnetic amplifier 35 would be driven towards saturation, while the magnetic amplifier 36 would be driven toward cutoff. Thus, the magnetic amplifier 35 would have an increased output which would give a voltage across the mixing resistor 54 which is positive at its upper terminal, and, therefore, under these conditions, the resultant voltage across the two mixing resistors 54 and 55 would be positive at the upper terminal. The effect of the anti-hunt damping windings 38 and 45 and the anti-hunt degeneration windings 70 and 46 will be discussed later. It will be seen that under steady-state conditions, the outputs of the magnetic amplifiers 35 and 36 are matched across the mixing resistors 54 and 55, and, therefore, the resultant output of the two magnetic amplifiers across the mixing resistor is zero.

The second magnetic amplifier stage 21 consists of the two magnetic amplifiers 64 and 65, both connected in a conventional doubler arrangement. The magnetic amplifier 64 has main windings 66 and 67, connected in series with saturating rectifiers 68 and 69, respectively. The two series circuits are connected in parallel with each other. The magnetic amplifier 64 also has a bias winding 71, an IR compensating winding 72, and a control winding 73.

The magnetic amplifier 65, which is connected in push-pull with the magnetic amplifier 64, has main windings 74 and 75 connected in series with saturating rectifiers 76 and 77, respectively. The two series circuits are connected in parallel. The magnetic amplifier 65 has a bias winding 78, an IR compensation winding 79 and control winding 80. The magnetic amplifier 64 is supplied from the transformer T3 which has one terminal connected between the saturating rectifiers 68 and 69 and the opposite terminal connected to one input terminal of a full wave bridge rectifier 81. The opposite input terminal of the full wave bridge rectifier 81 is connected between the two main windings 66 and 67 of the magnetic amplifier 64. The magnetic amplifier 65 is supplied from the transformer T4 which has one terminal connected between the saturating rectifiers 76 and 77 and the opposite terminal connected to an input terminal of the full wave bridge rectifier 82. The opposite input terminal of the full wave bridge rectifier 82 is connected at a point between the main windings 74 and 75 of the magnetic amplifier 64.

The drive motor 16 for the first mill stand 4 is connected in series circuit which contains a series field 83, commutating field 84, and the armature of the booster generator 17. The series circuit is connected across the supply leads 14 and 15. The booster generator 17 has a tapped main field 85 and an auxiliary field 86. The booster generator 17 is provided to compensate for the IR drop in the circuit of the armature of the motor 16, and, therefore, the excitation of its main field winding 85 must be a function of the magnitude and sense of the IR drop in that circuit. This is accomplished by connecting the IR compensating windings 72 and 79 of the magnetic amplifiers 64 and 65 in series with each other across the commutating field 84 of the drive motor 16. Thus, if the voltage drop across the commutating field 84 is of the polarity shown, a current will flow through the IR compensating windings 79 and 72 in the direction indicated. If the voltage drop across the commutating field 84 is opposite to the polarity shown, which would occur on regeneration or reverse rotation of the motor 16, current would flow through the circuit in the opposite direction. The IR compensation control windings 72 and 79 are wound such that when a current flows through the windings in the direction indicated, the core of the magnetic amplifier 65 will be driven toward saturation and the magnetic amplifier 64 will be driven toward cutoff and when the current flows in the direction opposite to that shown, the core of magnetic amplifier 64 will be driven toward saturation while the magnetic amplifier 65 will be driven toward cutoff.

The control windings 73 and 80 of the magnetic amplifiers 64 and 65 are connected to receive energization supplied from the output of the first magnetic amplifier stage across the mixing resistors 54 and 55. The circuit comprises a blocking rectifier 93 and mixing resistor 94 connected in series with mixing resistor 95 and the blocking rectifier 96 across the terminals of the mixing resistors 54 and 55. The control winding 80 of the magnetic amplifier 65 is connected in series with a rectifier 97 across the series combination of the blocking rectifier 93 and the mixing resistor 94 and the control winding 73 of the magnetic amplifier 64 is connected in series with the rectifier 98 across the series combination of the mixing resistor 95 and the blocking rectifier 96. The blocking rectifiers 93 and 96 are oppositely poled such that if the upper terminal on the mixing resistor 54 were positive with respect to the lower terminal on the mixing resistor 55, a current would flow from the upper terminal of the mixing resistor 54 through the rectifier 97, control winding 80, mixing resistor 95 and the blocking rectifier 96 to the lower terminal of the mixing resistor 55. This condition exists when the tension in the strip of material 2 is greater than that selected by the reference source. When the tension in the strip is less than that selected by the reference source, the lower terminal of the mixing resistor 55 will be positive with respect to the upper terminal of the mixing resistor 54 and a current will flow from the lower terminal of the mixing resistor 55 through the rectifier 98, the control winding 73 of the magnetic amplifier 64, the mixing resistor 94, and the blocking rectifier 93 to the upper terminal of the mixing resistor 54. The circuit of each of the control windings 73 and 80 is poled in such a direction that a current flowing in either winding will drive the core on which the respective winding is wound toward saturation. If the tension in the strip of material 2 is that which is selected by the reference source, current will not flow in either of the control windings 73 or 80 of the second stage magnetic amplifiers 64 and 65, and therefore the second magnetic amplifier stage 21 will simply act to compensate for the IR drop in the circuit of the armature of the drive motor 16.

It has already been demonstrated how the IR compensating windings 72 and 79 of the second stage magnetic amplifiers 64 and 65, respectively, control the output of their respective amplifiers in accordance with the armature current of the drive motor 16. The output of the magnetic amplifier 65 will appear across the output terminals of the full wave bridge rectifier 82. The output terminals of the full wave bridge rectifier 82 are connected across one half of the main field winding 85 of the booster generator 17, and, therefore, the output of the magnetic amplifier 65 controls the excitation of the booster generator 17. The portion of the field winding 85 which is connected across the output terminals of the full wave bridge rectifier 82 is wound in such a direction and connected to full wave bridge rectifier 82 in such a manner that an increase of voltage across the output terminals of the full wave bridge rectifier 82 increases the excitation of the booster generator 17, and thus increases the voltage generated by the booster generator in the sense shown.

Thus, if the IR drop across the commutating field 84 increases in the sense shown, an increased current flows in the direction shown through the IR compensating windings 79 and 72 of the magnetic amplifiers 65 and 64 respectively, which causes the output of the magnetic amplifier 65 to increase and as a consequence, the voltage across the output terminals of the full wave bridge rectifier 82 to increase, thus increasing the excitation of the booster generator 17. Under these conditions, the voltage of the booster generator 17 increases to compensate for the increased IR drop in the armature circuit of the motor 16.

The output terminals of the full wave bridge rectifier 81 are connected across the remaining half of the field winding 85 of the booster generator 17, and the connection is such that an output from the full wave bridge rectifier 81 reduces the excitation of the booster generator 17 to reduce its output or, under certain conditions, causes the output of the booster generator 17 to reverse polarity.

It will be appreciated from the above discussion that IR compensation is provided for the armature circuit of the drive motor 16 regardless of the direction of rotation of the motor and regardless of whether the current in the circuit is in the normal sense for the given direction of rotation or regenerative as on braking.

The auxiliary field winding 86 of the booster generator 17 is connected in series with an adjustable resistor 99 across the two anti-hunt damping windings 38 and 45 of the first magnetic amplifier stage 20. The auxiliary field winding 86 provides a signal which is substantially proportional to the rate of change of the booster generated voltage. This stems from the fact that the winding 86 is magnetically coupled with field 85 which produces the excitation flux. This is a D. C. flux. Hence, under steady state conditions, when the excitation flux is constant, no voltage is induced in winding 86. Under transient conditions the ampere turns of field 85 are varied by the magnetic amplifier and the excitation flux correspondingly changes. The rate of change of the excitation flux induces a voltage in winding 86. Since the output voltage of the booster generator is proportional to the excitation flux, the rate of change of the output voltage is approximately proportional to the rate of change of the excitation flux, and the voltage of winding 86 is proportional to the rate of change of the booster generator voltage. Since the voltage of winding 86 is fed back to the first magnetic amplifier stage 20, it provides a powerful damping effect. The adjustable resistor 99 and capacitor 92 form an RC delay network in the anti-hunt damping feedback loop. The anti-hunt degeneration windings 70 and 46 of the first magnetic amplifier stage 20 are connected in series with each other and an adjusting potentiometer 100 directly across the main field winding 85 of the booster generator 17. Thus, a degenerative feedback is provided around the two stages of the magnetic amplifier. This feedback not only improves stability, but serves to linearize the transfer characteristics of the magnetic amplifier.

It has already been described how a strip tension which is greater than that selected by the reference voltage causes a current to circulate through the control winding 80 of the magnetic amplifier 65, and this causes an increase of the output of the magnetic amplifier 65. Thus, the voltage across the output terminals of the full wave bridge rectifier 82 increases. The excitation of the booster generator 17 is increased and thus the voltage generated by the booster generator 17 is increased to cause a motoring current to flow in motor 16. Consequently, the drag of the first mill stand is reduced to reduce the tension of the strip of material 2. Conversely, when the tension is less than that selected by the reference voltage, a current will circulate in the control winding 73 of the second stage magnetic amplifier 64 to reverse the excitation of the main field winding 85 and thereby reverse the voltage of the booster generator 17, thus causing a regenerating current to flow in the drive motor 16 of the first mill stand. This causes the drag of the first mill stand to increase, and to increase the tension in the strip of material 2.

When threading the strip of material into the mill, it is necessary to remove the regulation from the system. Otherwise, there would be no tension signal on the tension control windings 41 and 48 of the first magnetic amplifier stage 20 and the reference signal would have its maximum effect on the first magnetic amplifier stage to cause the motor of the first mill stand to slow down, stop or even reverse depending upon the limits of the regulating system, while the second mill stand would be rotating at normal speed. The same would hold true in the event that the strip of material between the first and second mill stands should break, the first stand motor would slow down immediately. In order that the threading operation may be accomplished without the tension regulation, a magnetic amplifier relay circuit 26 is provided. The voltage sensitive magnetic relay circuit is shown and described in detail in a copending application of Arthur O. Fitzner, Serial No. 378,585, filed September 4, 1953, entitled Electrical Control Apparatus and assigned to the assignee of this invention. The magnetic amplifier relay circuit 26 comprises the magnetic amplifier 110 which has its circuits connected in a conventional doubler arrangement. The magnetic amplifier 110 has main windings 111 and 112. The main winding 111 is connected in series with the saturating rectifier 113 and the main winding 112 is connected in series with the saturating rectifier 114, and the two series circuits are connected in parallel. The magnetic amplifier 110 is provided with a control winding 115, a biasing winding 116 and a feedback winding 117. The magnetic amplifier 110 is supplied from a transformer T5 which is connected across two leads L1 and L2 of an alternating current source. One terminal of the transformer T5 is connected to a point between the saturating rectifiers 113 and 114, and another terminal is connected to an input terminal of the full wave bridge rectifier 118. The opposite input terminal of the full wave bridge rectifier 118 is connected to a point between the two main windings 111 and 112 of the magnetic amplifier 110. The biasing winding 116 is connected in series with an adjusting resistor 119 across the output terminals of a full wave bridge rectifier 120, the input terminals of which are connected across the secondary winding terminals of the transformer T5. The feedback winding 117 is connected directly across the output terminals of the bridge rectifier 118 and is connected for positive feedback. The control winding 115 of the magnetic amplifier 110 is connected directly across the mixing potentiometer 34 which receives the resultant output voltage generated by the tensiometer 5.

An electromagnetic relay 121 has its coil 122 connected directly across the output terminals of the full wave bridge 118 to receive the output of the magnetic amplifier 110. The electromagnetic relay 121 and the magnetic amplifier 110 have their characteristics matched such that the electromagnetic relay 121 will only be picked up when there is a signal generated by the tensiometer 5 which occurs only when strip is operatively passing between the first and second mill stands.

The transformers T1, T2, T3 and T4 which supply the energization for the first and the second magnetic amplifier stages 20 and 21, respectively, are connected to be energized from the alternating current buses L1 and L2. The transformers T1 and T2 which supply the source for the magnetic amplifiers 35 and 36 of the first stage are connected to the source through a hand switch S1 and contacts 123 of the electromagnetic relay 121. Thus, when the tensiometer 5 generates a signal, the magnetic amplifier 110 has an output which will energize the coil 122 of the electromagnetic relay 121, and cause it to close its contacts 123 to put the first magnetic amplifier stage 20 in the system. Under these conditions, the system operates as previously described. However, when the strip of material 2 is not operatively passing through the mill, the electromagnetic relay 121 is not picked up and the first magnetic amplifier stage 20 is effectively eliminated from the system. Thus, the driving motor 16 for the first mill stand can be operated as desired without the tension regulation but, with the IR compensation provided by the second magnetic amplifier stage 21. For the threading operation, it is desirable that an appreciable amount of IR compensation be applied on the first mill stand to prevent stalling. This is accomplished since the IR compensation signal from the commutating field 84 is fed back to the second magnetic amplifier stage as described. The speed of response of this IR compensation is increased for the threading operation since removal of the first magnetic amplifier stage 20 from the system effectively removes the damping from the system.

When the electromagnetic relay 121 is energized it also closes its contacts 89 to by-pass a part of the adjusting resistor 119 and increase the bias of the magnetic amplifier. This renders the magnetic amplifier relay circuit 26 voltage sensitive as described in the copending application of Arthur O. Fitzner previously referred to.

It may be seen that the objects of this invention have been accomplished by providing a tension regulating and control system which gives positive and precise control of the strip tension between the first two stands of a mill, and which allows the first stand to be controlled as desired without tension regulation when the strip of material is not operatively passing between the mill stand.

Although one embodiment of this invention has been shown and described in detail in compliance with the patent statutes, it is to be particularly understood that the invention is not limited thereto or thereby, but that equivalents are clearly within the inventive scope.

We claim as our invention:

1. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, first and second individual sets of field windings for said generator, at least one magnetic amplifier stage connected to energize said first set of field windings, means for supplying a flux to the magnetic amplifier cores of said magnetic amplifier stage in accordance with the difference in a reference signal and a signal which is a function of the tension in the strip of material between the two rolls, said second individual set of field windings for said generator being connected to control means for said magnetic amplifier stage to supply said magnetic amplifier cores in accordance with the rate of change of voltage of said generator.

2. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, first and second individual sets of field windings for said generator, at least one magnetic amplifier stage connected to energize said first set of field windings, first, second, and third control windings for the individual magnetic amplifiers of said magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage.

3. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, first and second individual sets of control windings for said generator, at least two magnetic amplifier stages connected to energize said first set of field windings, the output of said first magnetic amplifier stage being connected to determine the output of said second magnetic amplifier stage, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, said fourth individual control means being connected to receive a signal which is porportional to the output of said second magnetic amplifier stage, said signal being of such polarity and said fourth individual control windings being wound upon their respective cores in such a manner that the signal will have a degenerative effect on the output of the magnetic amplifier stages.

4. A control system for a tension device having a pair of rolls between which a strip of material is disposed to pass comprising, a motor connected in driving relation with one roll, a controlled motor connected in driving relation with the other roll, a generator connected in circuit relationship with said controlled motor, excitation means for said generator, at least one magnetic amplifier stage, said excitation means for said generator being connected to receive its energization from the output of said magnetic amplifier stage, and means for determining the output of said magnetic amplifier stage in accordance with the current in the motor armature circuit and the difference between a reference signal and a signal which is a function of the tension in the strip of material.

5. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, excitation means for said generator, at least one magnetic amplifier stage, said excitation means for said generator being connected to receive its energization from the output magnetic amplifier stage, means for selectively determining the output of the output magnetic amplifier stage in accordance with the current in the motor armature circuit and the difference in a reference signal and a signal which is a function of the tension in the strip of material when the strip is operatively passing between the rolls and determining the output of the output magnetic amplifier stage in accordance with the current in the motor armature circuit only when the strip of material is not operatively passing between the two rolls.

6. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, excitation means for said generator, at least one magnetic amplifier stage, said excitation means for said generator being connected to receive its energization from the output magnetic amplifier stage, means for selectively determining the output of the output magnetic amplifier stage in accordance with the current in the motor armature circuit and the difference in a reference signal and a signal which is a function of the tension in the strip of material when the strip is operatively passing between the rolls and determining the output of the output magnetic amplifier stage in accordance with the current in the motor armature circuit and decreasing the response time thereto only when the strip of material is not operatively passing between the two rolls.

7. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, first and second individual sets of control windings for said generator, at least two magnetic amplifier stages connected to energize said first set of field windings, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, the output of said first magnetic amplifier stage being connected to determine the output of said second magnetic amplifier stage, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, said fourth individual control means being connected to receive a signal which is proportional to the output of said second magnetic amplifier stage, said signal being of such polarity and said fourth individual control windings being wound upon their respective cores in such a manner that the signal will have a degenerative effect on the output of the magnetic amplifier stages, first and second control windings for said second stage magnetic amplifiers, said first control windings being connected to receive the output of the first stage of magnetic amplifiers and said second control windings for said second stage of magnetic amplifiers being connected to receive a signal which is a function of current in the motor armature circuit.

8. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, first and second individual sets of control windings for said generator, at least two magnetic amplifier stages connected to energize said first set of field windings, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, the output of said first magnetic amplifier stage being connected to determine the output of said second magnetic amplifier stage, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, said fourth individual control means being connected to receive a signal which is proportional to the output of said second magnetic amplifier stage, said signal being of such polarity and said fourth individual control windings being wound upon their respective cores in such a manner that the signal will have a degenerative effect on the output of the magnetic amplifier stages, first and second control windings for said second stage magnetic amplifiers, said first control windings being connected to receive the output of the first stage of magnetic amplifiers and said second control windings for said second stage of magnetic amplifiers being connected to receive a signal which is a function of current in the motor armature circuit and means for removing the first stage of magnetic amplifiers from the system when the strip of material is not operatively passing between the pair of rolls.

9. A control system for a tension device having a pair of rolls between which a trip of material is disposed to pass comprising, a first and a second electric motor each connected in driving relation with one of the pair of rolls, said first and second motors adapted to be connected across a power source, a generator connected in circuit relationship with said first motor, first and second individual sets of control windings for said generator, at least two magnetic amplifier stages connected to energize said first set of field windings, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, the output of said first magnetic amplifier stage being connected to determine the output of said second magnetic amplifier stage, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, said fourth individual control means being connected to receive a signal which is proportional to the output of said second magnetic amplifier stage, said signal being of such polarity and said fourth individual control windings being wound upon their respective cores in such a manner that the signal will have a degenerative effect on the output of the magnetic amplifier stages, first and second control windings for said second stage magnetic amplifiers, said first control windings being connected to receive the output of the first stage of magnetic amplifiers and said second control windings for said second stage of magnetic amplifiers being connected to receive a signal which is a function of current in the motor armature circuit, a relay magnetic amplifier connected to have its output determined by the signal which is a measure of tension in the strip of material, said relay magnetic amplifier being adapted to cause said first stage of magnetic amplifiers to be effectively removed from the system until the signal which is a measure of tension in the strip is of a predetermined magnitude.

10. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, first and second individual sets of control windings for said generator, at least two magnetic amplifier stages connected to energize said first set of field windings, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, the output of said first magnetic amplifier stage being connected to determine the output of said second magnetic amplifier stage, first, second, third, and fourth control windings for the individual magnetic amplifiers of said first magnetic amplifier stage, said first individual control windings being connected to receive a reference voltage, said second individual control windings being connected to receive a signal which is a function of the tension of the strip of material, said first and second control windings being wound in such a manner and connected to their respective sources in such a manner as to have opposing effects on the saturation of the magnetic amplifiers, said third individual control means being connected to said second individual set of field windings for said generator to receive a signal which is a function of the rate of change of generator voltage, said fourth individual control means being connected to receive a signal which is proportional to the output of said second magnetic amplifier stage, said signal being of such polarity and said fourth individual control windings being wound upon their respective cores in such a manner that the signal will have a degenerative effect on the output of the magnetic amplifier stages, first and second control windings for said second stage magnetic amplifiers, said first control windings being connected to receive the output of the first stage of magnetic amplifiers and said second control windings for said second stage of magnetic amplifiers being connected to receive a signal which is a function of current in the motor armature circuit, a relay magnetic amplifier connected to have its output determined by the signal which is a measure of tension in the strip of material, a relay having an energizing means and contact means, the energizing means for said relay being connected to receive the output of said relay magnetic amplifier and the contacts of said relay being adapted to selectively disconnect and connect the first stage of magnetic amplifiers and the system when in the deenergized and energized conditions respectively.

11. A control system for a tension device having a pair of rolls between which a strip of material is disposed to pass comprising a first and a second electric motor each connected in driving relation with one of the pair of rolls, said first and second motors adapted to be connected across a power source, a generator connected in circuit relationship with said first motor, a first and a second stage of magnetic amplifiers, excitation means for said generator connected to be supplied by the second stage of magnetic amplifiers, the second stage of magnetic amplifiers connected to have its output controlled in accordance with the output of said first magnetic amplifier stage and the current in the armature circuit of the first electric motor, the first stage of magnetic amplifiers being connected to have its output controlled in accordance with a signal which is the difference between a reference signal and a signal which is a function of the tension in the strip of material, and a relay means for selectively connecting the first stage of magnetic amplifiers and the system when the strip of material is operatively passing between the pair of roll stands and disconnecting the first stage of magnetic amplifiers from the system when the strip of material is not operatively passing between the pair of roll stands.

12. A control system for a tension device having a pair of rolls between which a strip of material is disposed to pass comprising a first and a second electric motor each connected in driving relation with one of the pair of rolls, said first and second motors adapted to be connected across a power source, a generator connected in circuit relationship with said first motor, a first and a second stage of magnetic amplifiers, excitation means for said generator connected to be supplied by the second stage of magnetic amplifiers, the first stage of magnetic amplifiers being connected to have its output controlled in accordance with a signal which is the difference between a reference signal and a signal which is a function of the tension in the strip of material, and a relay means for selectively connecting the first stage of magnetic amplifiers and the system when the strip of material is operatively passing between the pair of roll stands and disconnecting the first stage of magnetic amplifiers from the system when the strip of material is not operatively passing between the pair of roll stands.

13. A tension control system for a tension device use with a mill having a pair of rolls between which a strip of material is disposed to pass comprising, a motor connected in driving relation with one roll, a controlled motor connected in driving relation with the other roll stand, a generator connected in circuit relationship with said controlled motor, excitation means for said generator, at least one amplifier stage, said excitation means for said generator being connected to receive its energization from the output amplifier stage, and means for determining the output of the output amplifier stage in accordance with the current in the controlled motor armature circuit and the difference in a reference signal and a signal which is a function of the tension in the strip of material.

14. A control system for a tension device having a pair of rolls between which a strip of material is disposed to pass comprising, a first and a second electric motor each connected in driving relation with one of the pair of rolls, said first and second motors adapted to be connected across a power source, a generator connected in circuit relationship with said first motor, excitation means for said generator, at least one amplifier stage, said excitation means for said generator being connected to receive its energization from the output magnetic amplifier stage, means for selectively determining the output of the output amplifier stage in accordance with the current in the motor armature circuit and the difference in a reference signal and a signal which is a function of the tension in the strip of material when the strip is operatively passing between the rolls and determining the output of the output amplifier stage in accordance with the current in the motor armature circuit only when the strip of material is not operatively passing between the two rolls.

15. A control system for a tension device having a pair of rolls between which a strip of material is disposed to pass comprising a first and a second electric motor each connected in driving relation with one of the pair of rolls, said first and second motors adapted to be connected across a power source, a generator connected in circuit relationship with said first motor, a first and a second stage of amplifiers, excitation means for said generator connected to be supplied by the second stage of amplifiers, the second stage of amplifiers connected to have its output controlled in accordance with the output of said first amplifier stage and the current in the armature circuit of the first electric motor, the first stage of amplifiers being connected to have its output controlled in accordance with a signal which is the difference between a reference signal and a signal which is a function of the tension in the strip of material, and a relay means for selectively connecting the first stage of amplifiers and the system when the strip of material is operatively passing between the rolls and disconnecting the first stage of magnetic amplifiers from the system when the strip of material is not operatively passing between the two rolls.

16. A control system for a tension device having a pair of rolls between which a strip of material is disposed to pass comprising a first and a second electric motor each connected in driving relation with one of the pair of rolls, said first and second motors adapted to be connected across a power source, a generator connected in circuit relationship with said first motor, a first and a second stage of amplifiers, excitation means for said generator connected to be supplied by the second stage of amplifiers, the first stage of amplifiers being connected to have its output controlled in accordance with a signal which is the difference between a reference signal and a signal which is a function of the tension in the strip of material, and a relay means for selectively connecting the first stage of magnetic amplifiers and the system when the strip of material is operatively passing between the rolls and disconnecting the first stage of magnetic amplifiers from the system when the strip of material is not operatively passing between the two rolls.

References Cited in the file of this patent

UNITED STATES PATENTS

| 2,661,009 | Dunnegan | Dec. 1, 1953 |
| 2,677,080 | Halter | Apr. 27, 1954 |